United States Patent
Deprez et al.

(10) Patent No.: US 11,345,332 B2
(45) Date of Patent: May 31, 2022

(54) CONTROL METHOD AND CONTROL UNIT FOR A HYBRID VEHICLE

(71) Applicant: ZF Friedrichshafen AG, Friedrichshafen (DE)

(72) Inventors: Frank Deprez, Mariabrunn (DE); Holger Bacher, Lindau (DE); Jens Kastens, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 248 days.

(21) Appl. No.: 16/403,891

(22) Filed: May 6, 2019

(65) Prior Publication Data

US 2019/0344781 A1 Nov. 14, 2019

(30) Foreign Application Priority Data

May 8, 2018 (DE) ...................... 10 2018 207 122.5

(51) Int. Cl.
*B60W 20/40* (2016.01)
*B60W 10/06* (2006.01)
(Continued)

(52) U.S. Cl.
CPC ............ *B60W 20/40* (2013.01); *B60W 10/02* (2013.01); *B60W 10/06* (2013.01); *B60W 10/08* (2013.01);
(Continued)

(58) Field of Classification Search
CPC ...... B60W 20/40; B60W 10/06; B60W 10/08; B60W 10/10; B60W 30/18063; B60W 10/02; B60W 2510/0291; B60W 2510/104; B60W 2510/107; B60W 2510/244; B60W 2540/10; B60W 2710/02; B60W 2400/00; B60W 2510/0638; B60W 2510/081;
(Continued)

(56) References Cited

U.S. PATENT DOCUMENTS

| 8,386,107 B2 | 2/2013 | Shimanaka |
| 2011/0087394 A1* | 4/2011 | Shigeki ................. B60W 10/08 701/22 |
| 2017/0218870 A1 | 8/2017 | Yang et al. |

FOREIGN PATENT DOCUMENTS

| DE | 102013224379 | 5/2015 |
| JP | 2004-040872 A * | 2/2004 ......... Y02T 10/7072 |

* cited by examiner

*Primary Examiner* — Brian P Sweeney
(74) *Attorney, Agent, or Firm* — Dority & Manning, P.A.

(57) ABSTRACT

A method for operating a hybrid vehicle having a prime mover including an internal combustion engine and an electric machine, the vehicle further having a transmission connected between the prime mover and a driven end and including multiple shift elements, the vehicle further having a separating clutch connected between the internal combustion engine and the electric machine, and a starting component which is provided by a separate launch clutch or by a shift element of the transmission. The method includes monitoring a rotational speed of one of the internal combustion engine, the electric machine, the transmission, or the driven end during travel with the internal combustion engine running and the separating clutch engaged. The method further includes determining an increase in driving resistance, and decoupling the internal combustion engine when the monitored rotational speed falls below or reaches a first limiting value by disengaging the separating clutch.

12 Claims, 4 Drawing Sheets

(51) Int. Cl.
*B60W 10/08* (2006.01)
*B60W 10/10* (2012.01)
*B60W 30/18* (2012.01)
*B60W 10/02* (2006.01)

(52) U.S. Cl.
CPC ...... *B60W 10/10* (2013.01); *B60W 30/18063* (2013.01); *B60W 2400/00* (2013.01); *B60W 2510/0291* (2013.01); *B60W 2510/0638* (2013.01); *B60W 2510/081* (2013.01); *B60W 2510/104* (2013.01); *B60W 2510/107* (2013.01); *B60W 2510/244* (2013.01); *B60W 2540/10* (2013.01); *B60W 2540/12* (2013.01); *B60W 2710/02* (2013.01)

(58) Field of Classification Search
CPC ............. B60W 2540/12; B60W 20/15; B60W 30/18118; B60W 20/10; Y02T 10/62
See application file for complete search history.

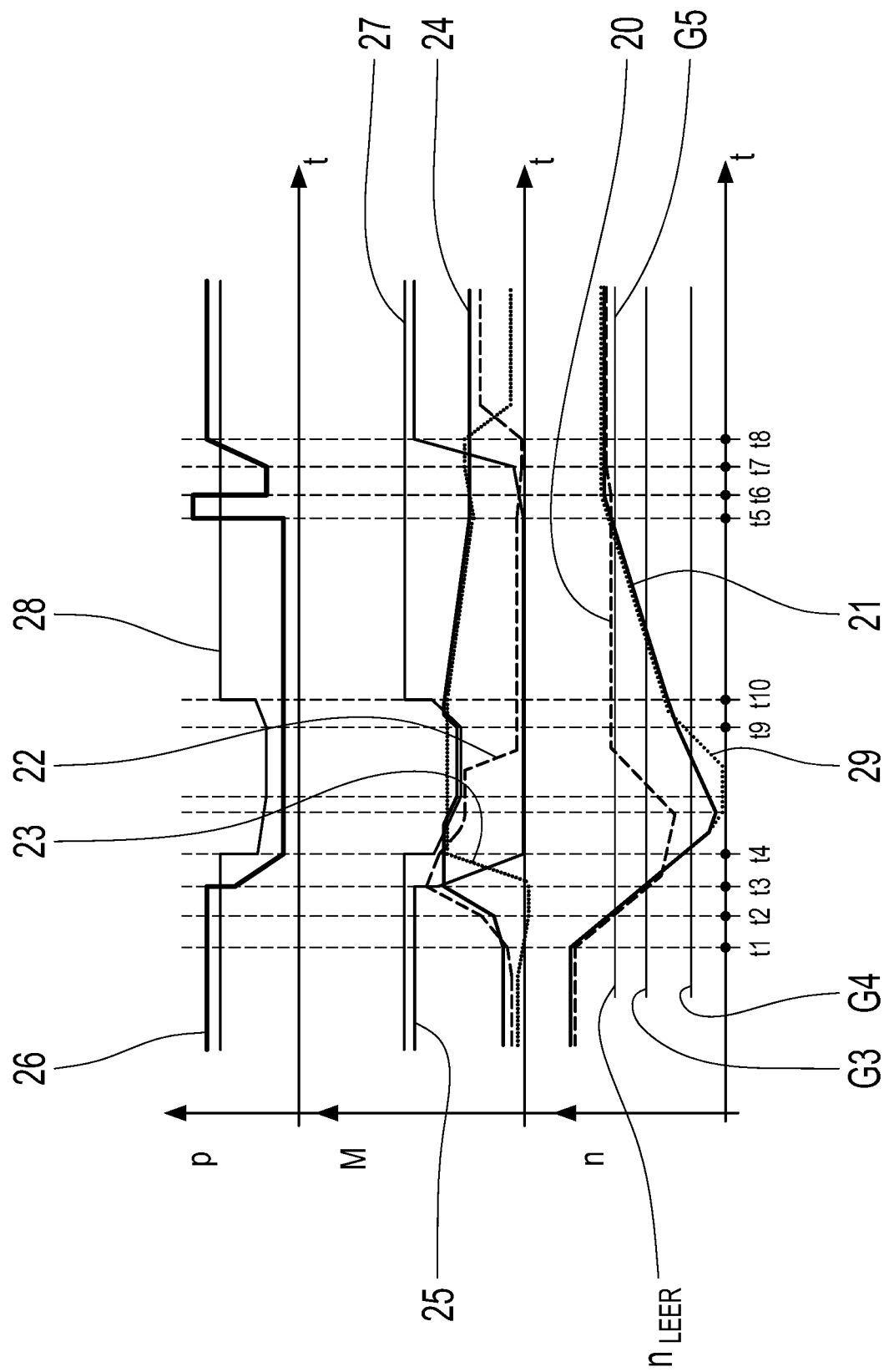

CONTROL METHOD AND CONTROL UNIT FOR A HYBRID VEHICLE

FIELD OF THE INVENTION

The invention relates generally to a control method for operating a hybrid vehicle. Moreover, the invention relates to a control unit for carrying out the method.

BACKGROUND

FIG. 1 shows a diagram of a drive train of a hybrid vehicle. A hybrid vehicle includes a prime mover 1 which includes an internal combustion engine 2 and an electric machine 3. Moreover, a hybrid vehicle includes a transmission 4 which is connected between the prime mover 1 and a driven end 5 of the hybrid vehicle. An electric accumulator 6 cooperates with the electric machine 3. When the electric machine 3 is operated as a motor, the electric accumulator 6 is discharged to a greater extent. When the electric machine 3 is operated as a generator, the electric accumulator 6 is charged to a greater extent. A separating clutch 7 is connected between the internal combustion engine 2 and the electric machine 3. The transmission 4 includes multiple shift elements 8. One single shift element 8 is shown, by way of example, in FIG. 1. During the starting operation of the hybrid vehicle, one of the shift elements 8 of the transmission 4 acts as a transmission-internal starting component. In contrast thereto, it is also possible that a separate, transmission-external starting component is connected between the electric machine 3 and the transmission 4.

The operation of the transmission 4 is controlled by a transmission control unit 9 by an open-loop system and/or a closed-loop system. The operation of the internal combustion engine 2 is controlled by an engine control unit 10 by an open-loop system and/or a closed-loop system. The operation of the electric machine 3 is controlled by a hybrid control unit 11 by an open-loop system and/or a closed-loop system. The hybrid control unit 11 also controls the separating clutch 7. The dashed-line double arrows from FIG. 1 visualize the data exchange of the control units 9, 10, and 11 with the appropriate assemblies of the hybrid vehicle. For example, the transmission control unit 9 exchanges data with the transmission 4 and the hybrid control unit 11. The engine control unit 10 exchanges data with the internal combustion engine 2 and the hybrid control unit 11. Moreover, the hybrid control unit 11 exchanges data with the electric machine 3, the electric accumulator 6, and the separating clutch 7.

It is known from practical experience that a rotational speed is monitored during travel when the internal combustion engine 2 is running. In fact, when the running internal combustion engine 2 is coupled by the engaged separating clutch 7 to the power flow toward the driven end 5, the internal combustion engine 2 is decoupled from the power flow when the monitored rotational speed falls below a limiting value, in particular in order to avoid stalling the internal combustion engine 2. The monitored rotational speed is a rotational speed of the internal combustion engine 2, a rotational speed of the electric machine 3, a rotational speed of the driven end 5, or a rotational speed of the transmission 4, such as a rotational speed of a transmission input shaft of the transmission 4.

DE 10 2013 224 379 A2 discloses a method for operating a hybrid vehicle in which, during the recuperation operation, when the electric machine is operated as a generator, a coupling element connected between the internal combustion engine and the electric machine is actuated such that the internal combustion engine is partially decoupled from the electric machine.

U.S. Pat. No. 8,386,107 B2 discloses a method for operating a hybrid vehicle in which a deceleration of the vehicle is detected and a downshift in the transmission is carried out. Depending on the deceleration and the downshift, a standstill of the engine is predicted and, depending thereon, an engagement element is disengaged or brought into a state of slip.

On the basis thereof, the problem addressed by the invention is that of creating a new type of method for operating a hybrid vehicle and of creating a control unit for operating a transmission.

SUMMARY OF THE INVENTION

According to the invention, when the monitored rotational speed falls below or reaches the first limiting value, the internal combustion engine is decoupled from the power flow by disengaging the separating clutch connected between the internal combustion engine and the electric machine.

Within the meaning of the present invention, when the monitored rotational speed falls below the first limiting value—with the internal combustion engine running, the electric machine running and preferably operating as a motor, and the separating clutch engaged—and, on the basis thereof, an elevated driving resistance is inferred, the internal combustion engine is decoupled by disengaging the separating clutch connected between the internal combustion engine and the electric machine in order to protect the internal combustion engine against stalling.

As a result, not only is an excessive reduction of the rotational speed of the internal combustion engine avoided, but torque is also providable at the driven end of the hybrid drive with the aid of the electric machine of the prime mover, in order to avoid the situation in which the hybrid vehicle undesirably rolls backward. As a result, driving safety is enhanced.

According to an advantageous embodiment, the first limiting value of the monitored rotational speed, upon the attainment or falling below of which the separating clutch is disengaged, is determined depending on a gradient of the reduction of the monitored rotational speed with respect to time, and/or depending on a temperature, in particular, an ambient temperature, and/or depending on a state of charge of an electric accumulator, from which the electric machine is supplied with electrical energy. Such determination of the first limiting value (e.g., depending on the gradient of the rotational speed reduction of the monitored rotational speed with respect to time, and/or depending on the temperature, and/or depending on the state of charge of the electric accumulator) allows for a particularly advantageous decoupling of the internal combustion engine in order to protect the internal combustion engine against stalling.

According to an advantageous embodiment, when the monitored rotational speed falls below or reaches the limiting value, the power transmission capacity of the separating clutch is abruptly reduced to a level of the torque presently transmitted by separating clutch and is subsequently further ramped down or reduced. Preferably, a gradient for the ramping down of the power transmission capacity of the separating clutch with respect to time is determined depending on the gradient of the reduction of the monitored rotational speed with respect to time, and/or depending on a temperature, in particular an ambient temperature, and/or depending on a state of charge of the electric accumulator, from which the electric machine is supplied with electrical energy. These details also allow for a particularly advantageous decoupling of the internal combustion engine from the power flow.

According to an advantageous embodiment, after the internal combustion engine is decoupled from the power flow by disengaging the separating clutch, the separating clutch is subsequently engaged again or "re-engaged" when both the rotational speed of the internal combustion engine as well as the rotational speed of the electric machine exceed a second limiting value which is greater than the first limiting value. As a result, the internal combustion engine is subsequently particularly advantageously coupled again.

According to an advantageous embodiment, when the rotational speed of the electric machine or a rotational speed dependent on this rotational speed falls below a third limiting value, which is less than the first limiting value, after the internal combustion engine has been decoupled from the power flow by disengaging the separating clutch, the starting component is additionally disengaged. Preferably, the starting component is subsequently engaged again or "re-engaged" when a differential speed at the starting component falls below or reaches a fourth limiting value and, in addition, an input-side or output-side rotational speed of the starting component exceeds or reaches a fifth limiting value. With this embodiment of the invention, the situation is prevented in which the electric machine enters so-called derating and, as a result, limits the amount of torque provided. If the transmission oil supply depends on the electric machine, the transmission oil supply is maintained in this way.

BRIEF DESCRIPTION OF THE DRAWINGS

Preferred embodiments result from the dependent claims and the following description. Exemplary embodiments of the invention are explained in greater detail with reference to the drawing, without being limited thereto. Wherein:

FIG. 4 shows a further timing chart for illustrating another embodiment of a method for operating a hybrid vehicle according to the invention.

DETAILED DESCRIPTION

Figure 1:
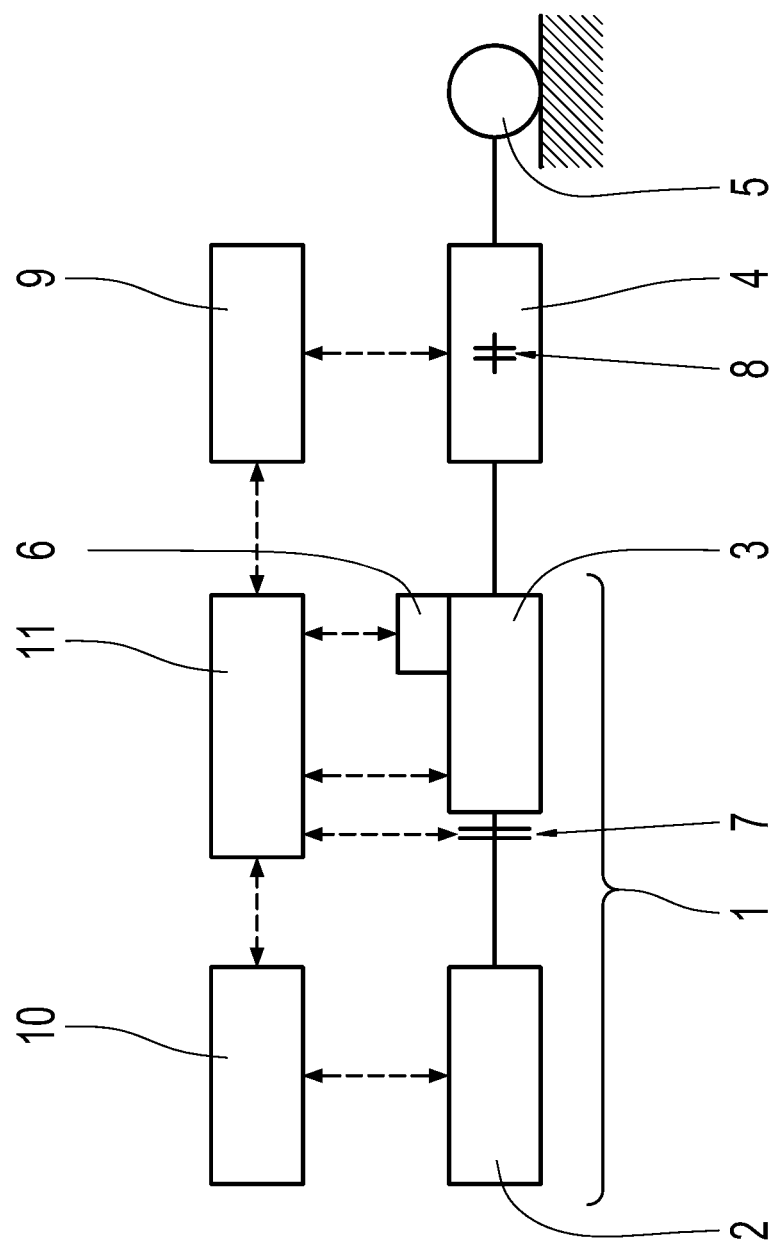
FIG. 1 shows a block diagram of a hybrid vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The invention relates to a method and to a control unit for operating a hybrid vehicle.

The fundamental configuration of a hybrid vehicle is known to a person skilled in the art, who is addressed here, and has been described above with reference to FIG. 1. In this regard, reference is made to the comments set forth with respect to FIG. 1.

The present invention now relates to those details for operating a hybrid vehicle, with the aid of which the internal combustion engine 2 is effectively protected against stalling, without the risk of the torque failing at the driven end 5, and, therefore, without the risk of the hybrid vehicle undesirably rolling backward, for the case in which the hybrid vehicle travels, for example, on an uphill grade or against an obstacle, i.e., the driving resistance increases, during travel with the internal combustion engine 2 running and the separating clutch 7 engaged.

Figure 2:
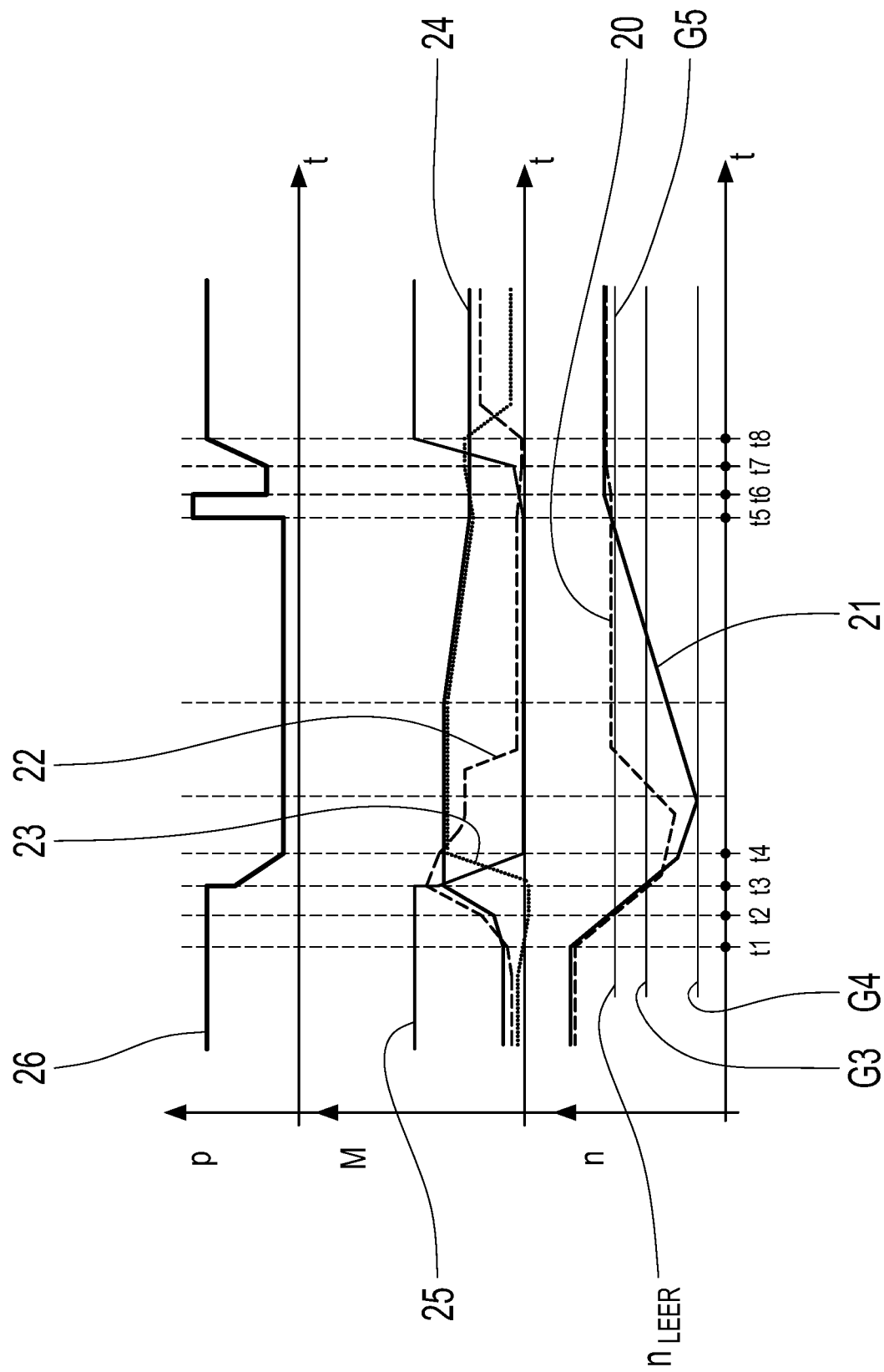
FIG. 2 shows a timing chart illustrating one embodiment of a method for operating a hybrid vehicle according to the invention.

Details of the method according to the invention are described in the following with reference to FIG. 2, wherein multiple time profiles of rotational speeds n, torques M, and a pressure control p are shown over the time t. The curve profile 20 from FIG. 2 shows a time profile of the rotational speed of the internal combustion engine 2. The curve profile 21 shows the time profile of a rotational speed of the electric machine 3. The curve profile 22 shows the time profile of a torque of the internal combustion engine 2. The curve profile 23 shows the time profile of a torque of the electric machine 3. The curve profile 24 shows the time profile of the torque at the driven end 5. A curve profile 25 shows a time profile of a torque transmitted by the separating clutch 7. The curve profile 26 shows the pressure control of the separating clutch 7.

Before the point in time t1, the hybrid vehicle travels with the internal combustion engine 2 running, with the electric machine 3 running and operating as a motor, and with the separating clutch 7 engaged. Beginning at the point in time t1, the rotational speed 20 of the internal combustion engine 2 and the rotational speed 21 of the electric machine 3 decrease due to the fact that the driving resistance of the hybrid vehicle increases while the gas pedal is actuated and the brake pedal is not actuated, for example, due to the onset of an uphill grade. Beginning at the point in time t2, the rotational speed 20 of the internal combustion engine 2 and the rotational speed of the electric machine 3 fall below the idling speed $n_{LEER}$.

The method is preferably carried out while the gas pedal is actuated and the brake pedal is not actuated. The method is also carried out for the case in which the driving resistance increases, for example, due to the onset of an uphill grade, while the gas pedal is not actuated during a crawling operation. During a crawling operation, the brake pedal can be unactuated or slightly actuated. Due to the slight actuation of the brake pedal, the crawling operation is continued. The hybrid vehicle also comes to a standstill in this case, wherein the method is not carried out due to the actuation of the brake pedal, but rather is carried out due to the detected increase in driving resistance.

In FIG. 2, the rotational speed 21 of the electric machine 3 is subsequently monitored. Another rotational speed is also monitored, for example, the rotational speed 20 of the internal combustion engine 2 or of a transmission input shaft of the transmission 4.

When, at the point in time t3, the monitored rotational speed falls below a first limiting value G3 with the internal combustion engine 2 running, with the electric machine 3 running and operating as a motor, with the separating clutch 7 engaged, and while the gas pedal actuated and the brake pedal is not actuated, the separating clutch 7 connected between the internal combustion engine 2 and the electric machine 3 is actuated to be disengaged, according to the curve profile 26, in order to thereby decouple the internal combustion engine 2 from the power flow to the driven end 5. As a result, the internal combustion engine 2 is protected against stalling. Torque is still providable at the driven end 5 with the electric machine 3 in order to avoid a safety-critical situation, in particular, a situation in which the motor vehicle undesirably rolls backward on an incline.

The first limiting value G3 of the monitored rotational speed, upon the attainment or falling below of which the separating clutch 7 is actuated in order to be disengaged, is preferably determined depending on a gradient with respect to time, according to which the monitored rotational speed decreases. This first limiting value G3 is determinable, additionally or alternatively, depending on a temperature, in particular a temperature of the separating clutch 7 or a transmission oil temperature, and/or depending on the state of charge of the electric accumulator 6.

As is apparent from FIG. 2, at the point in time t3, according to the pressure control 26, the power transmission capacity of the separating clutch 7 is initially abruptly reduced and, more particularly, to a value which is just sufficient for transmitting the torque presently transmitted by the separating clutch 7. The abrupt reduction of the power transmission capacity of the separating clutch 7 at the point in time t3 therefore abruptly reduces an excess contact pressure of the separating clutch 7.

Subsequent to the point in time t3, between the points in time t3 and t4, the power transmission capacity of the separating clutch 7 to be disengaged is further decreased in a ramp-like manner or linearly and, in fact, with a gradient, wherein this gradient for the ramp-like reduction of the power transmission capacity of the separating clutch 7 with respect to time—as well as the first limiting value G3—is preferably dependent on the gradient of the reduction of the monitored rotational speed with respect to time, and/or on the temperature, and/or on the state of charge of the electric accumulator 6.

At the point in time t4, the separating clutch 7 no longer transmits any torque. The rotational speed 20 of the internal combustion engine 2 stops decreasing and is increased, with the torque 22 of the internal combustion engine 2, to the level of the idling speed $n_{LEER}$.

When, subsequent to the disengagement of the separating clutch 7, both the rotational speed of the internal combustion engine 2 and the rotational speed of the electric machine 3 exceed a second limiting value G5, which is greater than the first limiting value G3, the separating clutch 7 is engaged again. In FIG. 2, the second limiting value G5 corresponds to the idling speed $n_{LEER}$. In FIG. 2, the rotational speed 20 of the internal combustion engine 2 and the rotational speed 21 of the electric machine 3 reach the idling speed $n_{LEER}$ at the point in time t5, wherein the previously disengaged separating clutch 7 is then actuated in order to be engaged, according to the pressure control 26, and, in particular, according to FIG. 2, initially via a rapid charging between the points in time t5 and t6, via a subsequent filling equalization phase between the points in time t6 and t7, and via a subsequent ramping up of the actuating pressure 26 for the separating clutch 7 between points in time t7 and t8, so that, at the point in time t8, the separating clutch 7 is completely engaged again and the internal combustion engine 2 is again coupled to the power flow toward the driven end 5.

As is apparent from the curve profile 24 from FIG. 2, even though the internal combustion engine 2 has been decoupled from the power flow, torque is providable at the driven end 5 with the aid of the electric machine 3. As such, there is no risk of the hybrid vehicle undesirably rolling backward.

Figure 3:
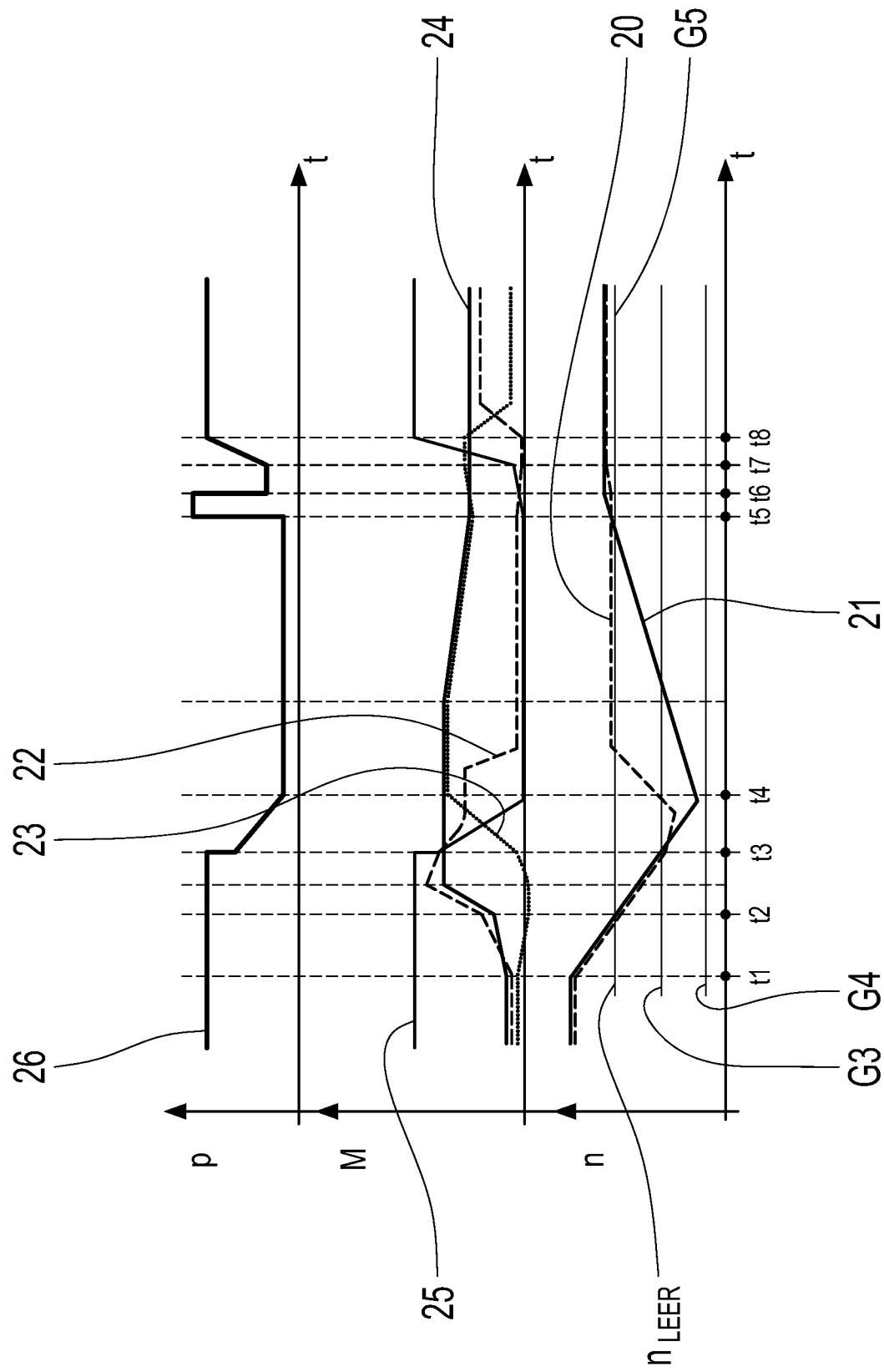
FIG. 3 shows a further timing chart illustrating another embodiment of a method for operating a hybrid vehicle according to the invention.

FIG. 3 likewise shows the curve profiles 20 to 26 from FIG. 2, wherein FIG. 3 differs from FIG. 2 merely in that, beginning at the point in time t1 in FIG. 3, the rotational speed changes with a lesser gradient with respect to time, the rotational speed triggering, on the control side, a disengagement of the separating clutch 7 upon the attainment or falling below of the first limiting value G3, according to the curve profile 26. The lesser gradient with respect to time influences the first limiting value G3, the point in time t3, as well as the gradient with which the power transmission capacity 26 of the separating clutch 7 is reduced subsequent to the point in time t3, between the points in time t3 and t4.

FIG. 4 shows another embodiment of the above-described method, wherein the curve profiles 21 to 26 from FIG. 2 are shown once again in FIG. 4, and, additionally, further curve profiles 27, 28, and 29 are shown. Curve profile 27 shows the torque transmitted by the starting component 8, curve profile 28 shows the pressure control for the starting component 8, and curve profile 29 shows a rotational speed an output-side half of the starting component 8.

In FIG. 4, as is also the case in FIG. 3, at the point in time t3, the separating clutch 7 is actuated in order to be disengaged when, at the point in time t3, the particular monitored rotational speed falls below the first limiting value G3. In this case, it is preferably the rotational speed 21 of the electric machine 3 that is monitored and falls below the first limiting value G3 at the point in time t3.

In FIG. 4, at the point in time t4, the rotational speed 21 of the electric machine 3 reaches or falls below a third limiting value G4, which is less than the first limiting value G3, so that, beginning at the point in time t4, the starting component 8 is actuated according to the pressure profile 28 in order to be disengaged. Simultaneously, the output-side rotational speed of the output-side half of the starting component 8 decreases, according to the curve profile 29. When, subsequent to the point in time t9, a speed differential at the starting component 8 decreases again, namely falling below or reaching a fourth limiting value, and furthermore, when an input-side or output-side rotational speed of the starting component 8 exceeds or reaches a fifth limiting value, the starting component 8 is actuated, starting at the point in time t9, in order to be engaged again, wherein this engagement of the starting component 8 is completed at the point in time t10.

With respect to all remaining details, FIG. 4 is the same as FIG. 2, and so reference is made to the comments made with respect to FIG. 2, in order to avoid unnecessary repetitions.

The invention also relates to a control unit for operating a hybrid vehicle, which is utilized for carrying out the above-described method according to the invention on the control side.

The control unit therefore monitors the above-described rotational speeds and, depending thereon, actuates at least the separating clutch 7 in order to protect the internal combustion engine 2, in particular, against stalling. The control unit is, in particular, the hybrid control unit 11.

The control unit includes means for carrying out the method according to the invention, namely hardware-side means and software-side means. The hardware-side means include data interfaces for exchanging data with the assemblies contributing to the carrying-out of the method according to the invention, such as with the separating clutch 7, the electric machine 3, and the engine control unit 10. The hardware-side means also encompass a processor for data processing and a memory for data storage. The software-side means include program components for carrying out the method according to the invention.

Modifications and variations can be made to the embodiments illustrated or described herein without departing from the scope and spirit of the invention as set forth in the appended claims.

REFERENCE CHARACTERS 1 prime mover
2 internal combustion engine
3 electric machine
4 transmission
5 driven end
6 electric accumulator
7 separating clutch
8 starting component
9 transmission control unit
10 engine control unit
11 hybrid control unit
20 rotational speed of internal combustion engine
21 rotational speed of electric machine
22 torque of internal combustion engine
23 torque of electric machine
24 torque of driven end
25 torque of separating clutch
26 pressure control of separating clutch
27 torque of starting component
28 pressure control of starting component
29 rotational speed of starting component
G3 first limiting value
G4 third limiting value
G5 second limiting value

The invention claimed is:

1. A method for operating a hybrid vehicle, the hybrid vehicle comprising a prime mover (1) including an internal combustion engine (2) and an electric machine (3), the hybrid vehicle further comprising a transmission (4) connected between the prime mover (1) and a driven end (5) and including multiple shift elements, the hybrid vehicle further comprising a separating clutch (7) connected between the internal combustion engine (2) and the electric machine (3), and a starting component (8) which is provided by a separate launch clutch or by a shift element of the transmission (4), the method comprising:

during travel with the internal combustion engine (2) running and the separating clutch (7) engaged, monitoring, by a control unit (9), a rotational speed of one of the internal combustion engine (2), the electric machine (3), the transmission (4), or the driven end (5);

determining, by the control unit (9), an increase in driving resistance; and commanding, by the control unit (9), decoupling of the internal combustion engine (2) when the rotational speed of the one of the internal combustion engine (2), the electric machine (3), the transmission (4), or the driven end (5) falls below or reaches a first limiting value (G3), wherein, when the rotational speed of the one of the internal combustion engine (2), the electric machine (3), the transmission (4), or the driven end (5) falls below or reaches the first limiting value (G3), the internal combustion engine (2) is decoupled by disengaging the separating clutch (7) connected between the internal combustion engine (2) and the electric machine (3), and wherein, during the travel with the internal combustion engine (2) running and the separating clutch (7) engaged, either a gas pedal of the hybrid vehicle is actuated and a brake pedal of the hybrid vehicle is unactuated, or the gas pedal of the hybrid vehicle is unactuated and the brake pedal is unactuated or slightly actuated when the hybrid vehicle is also in a crawling operation.

2. The method of claim 1, wherein the method is carried out while the gas pedal of the hybrid vehicle is actuated and the brake pedal of the hybrid vehicle is unactuated.

3. The method of claim 1, wherein the method is carried out while the gas pedal of the hybrid vehicle is unactuated when the hybrid vehicle is also in the crawling operation.

4. The method of claim 3, wherein the brake pedal is unactuated when the hybrid vehicle is also in the crawling operation.

5. The method of claim 1, wherein the first limiting value (G3) is determined depending on a gradient of a reduction of the rotational speed of the one of the internal combustion engine (2), the electric machine (3), the transmission (4), or the driven end (5) with respect to time.

6. The method of claim 1, wherein the first limiting value (G3) is determined depending on a temperature of the separating clutch (7) or a transmission oil temperature, depending on a state of charge of an electric accumulator (6) which supplies the electric machine (3) with electrical energy, or depending on both the temperature of the separating clutch (7) or the transmission oil temperature and the state of charge of the electric accumulator (6).

7. The method of claim 1, wherein, when the rotational speed of the one of the internal combustion engine (2), the electric machine (3), the transmission (4), or the driven end (5) falls below or reaches the first limiting value (G3), a power transmission capacity of the separating clutch (7) is initially abruptly reduced to a level of torque presently transmitted by the separating clutch (7) and is subsequently further ramped down.

8. The method of claim 7, wherein a gradient for the ramping down of the power transmission capacity of the separating clutch (7) with respect to time is determined depending on a gradient of a reduction of the rotational speed of the one of the internal combustion engine (2), the electric machine (3), the transmission (4), or the driven end (5) with respect to time, depending on an ambient temperature, depending on a state of charge of an electric accumulator (6) which supplies the electric machine (3) with electrical energy, or depending on a combination of the gradient of the reduction of the rotational speed of the one of the internal combustion engine (2), the electric machine (3), the transmission (4), or the driven end (5) with respect to time, the ambient temperature, and the state of charge of the electric accumulator (6).

9. The method of claim 1, further comprising, after decoupling the internal combustion engine (2) by disengaging the separating clutch (7), engaging, by the control unit (9), the separating clutch (7) when both the rotational speed of the internal combustion engine (2) and the rotational speed of the electric machine (3) exceed a second limiting value (G5), the second limiting value (G5) being greater than the first limiting value (G3).

10. The method of claim 1, further comprising, after decoupling the internal combustion engine (2) by disengaging the separating clutch (7), disengaging, by the control unit (9), the starting component (8) when the rotational speed of the electric machine (3) or a rotational speed dependent on the rotational speed of the electric machine (3) falls below a third limiting value (G4), the third limiting value (G4) being less than the first limiting value (G3).

11. The method of claim 10, further comprising subsequently engaging, by the control unit (9), the starting component (8) when a differential speed at the starting component (8) falls below or reaches a fourth limiting value and an input-side or output-side rotational speed of the starting component (8) exceeds or reaches a fifth limiting value.

12. A control unit for operating a hybrid vehicle, the hybrid vehicle comprising a prime mover (1) including an internal combustion engine (2) and an electric machine (3), the hybrid vehicle further comprising a transmission (4) connected between the prime mover (1) and a driven end (5) and including multiple shift elements, the hybrid vehicle further comprising a separating clutch (7) connected between the internal combustion engine (2) and the electric machine (3), and a starting component (8) provided by a separate launch clutch or by a shift element of the transmission (4), the control unit being configured to:
    during travel with the internal combustion engine (2) running, monitor a rotational speed of one of the internal combustion engine (2), the electric machine (3), the transmission (4), or the driven end (5);
    determine an increase in driving resistance; and
    command decoupling of the internal combustion engine (2) when the rotational speed of the one of the internal combustion engine (2), the electric machine (3), the transmission (4), or the driven end (5) falls below or reaches a first limiting value,
wherein the control unit commands the decoupling of the internal combustion engine (2) by controlling actuation of the separating clutch (7) connected between the internal combustion engine (2) and the electric machine (3) in order to disengage when the rotational speed of the one of the internal combustion engine (2), the electric machine (3), the transmission (4), or the driven end (5) falls below or reaches the first limiting value, and
wherein the control unit is configured such that, during the travel with the internal combustion engine (2) running and the separating clutch (7) engaged, either
    a gas pedal of the hybrid vehicle is actuated and a brake pedal of the hybrid vehicle is unactuated, or
    the gas pedal of the hybrid vehicle is unactuated and the brake pedal is unactuated or slightly actuated when the hybrid vehicle is also in a crawling operation.

\* \* \* \* \*